June 6, 1961 R. A. DEIBEL ET AL 2,986,761
WINDSHIELD CLEANING ARRANGEMENT
Filed Feb. 19, 1957 3 Sheets-Sheet 1
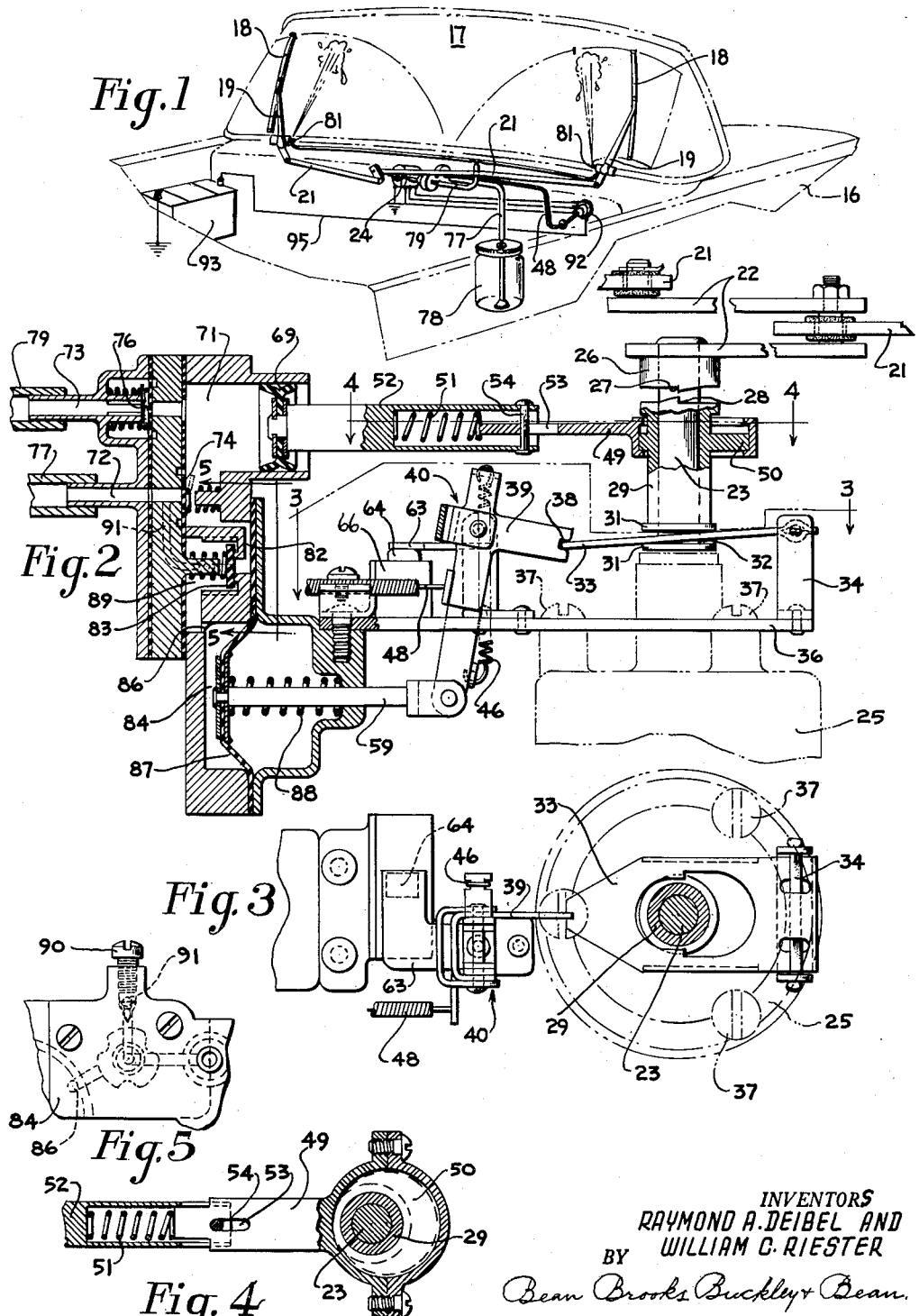
INVENTORS
RAYMOND A. DEIBEL AND
BY WILLIAM C. RIESTER
Bean Brooks Buckley & Bean
ATTORNEYS June 6, 1961  R. A. DEIBEL ET AL  2,986,761
WINDSHIELD CLEANING ARRANGEMENT
Filed Feb. 19, 1957  3 Sheets-Sheet 2
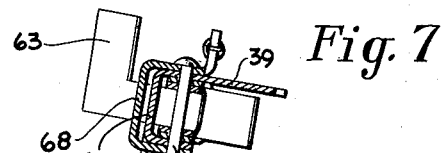
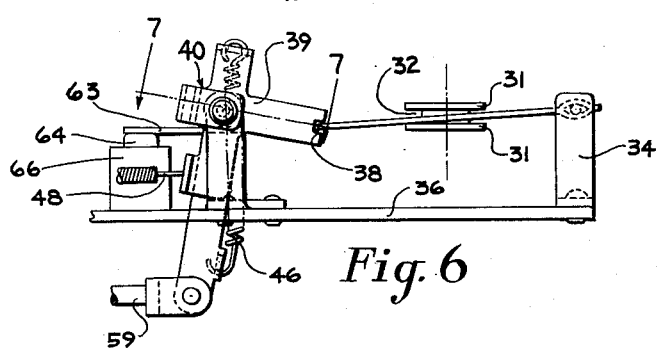
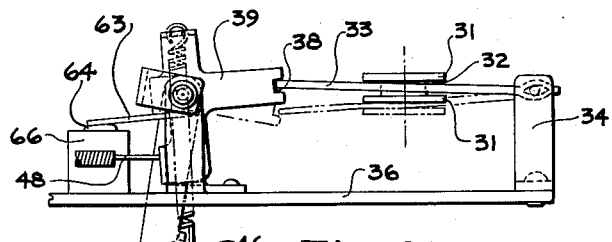
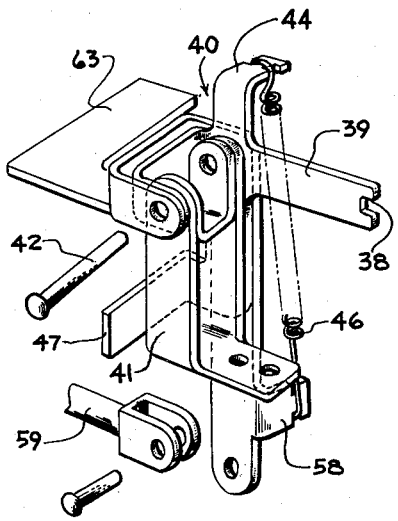
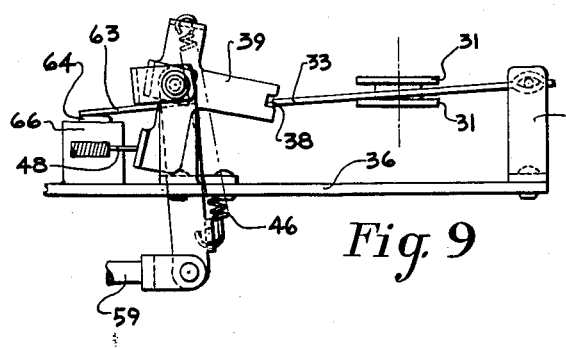
INVENTORS
RAYMOND A. DEIBEL AND
BY WILLIAM C. RIESTER
Bean Brooks Buckley & Bean
ATTORNEYS June 6, 1961  R. A. DEIBEL ET AL  2,986,761
WINDSHIELD CLEANING ARRANGEMENT
Filed Feb. 19, 1957  3 Sheets-Sheet 3

INVENTORS
RAYMOND A. DEIBEL AND
WILLIAM C. RIESTER
BY
Bean Brooks Buckley & Bean.
ATTORNEYS

# United States Patent Office 2,986,761
Patented June 6, 1961

2,986,761
WINDSHIELD CLEANING ARRANGEMENT
Raymond A. Deibel, Cheektowaga, and William C. Riester, Buffalo, N.Y., assignors to Trico Products Corporation, Buffalo, N.Y.
Filed Feb. 19, 1957, Ser. No. 641,104
11 Claims. (Cl. 15—250.02)

This invention relates to a windshield cleaning arrangement, and more particularly to an arrangement whereby cleaning liquid is sprayed in an interrupted stream upon the vehicle windshield.

In the vehicle windshield cleaning systems in use on automobiles of contemporary design, a stream of cleaning liquid is generally sprayed upon the windshield in a continuous manner for a predetermined period of time during which the wiper blades oscillate upon the wetted areas to scrub and clean the windshield. While such arrangements are generally satisfactory, there can occur a certain amount of water wastage in those instances where the water drains from the windshield before being engaged by the wiper blade during its movement.

In the arrangement of the present invention the cleaning liquid is sprayed upon the designated areas on the windshield in an interrupted manner, such interruption being synchronized with the movement of the wiper blades, resulting in an improved wiping action and less wastage of water for the above-discussed reason. In addition, the arrangement of the invention provides for continued wiping action for a predetermined selectably variable time after cessation of liquid spraying to assure complete drying of the sprayed areas. Briefly, the invention incorporates a pump mechanism which is driven by the wiper motor to cause an interrupted spray of cleaning liquid upon the windshield. The arrangement of the invention further features a compact assemblage extremely simple in structure and reliable in use.

The main object of this invention is to provide a vehicle windshield cleaning system wherein the cleaning liquid is sprayed upon designated areas in an interrupted manner and in synchronism with the wiper blades.

Another and equally important object of the invention is to provide a coordinated windshield cleaner and washer system wherein the cleaner unit is electrically driven and serves to mechanically operate the washer unit, means being provided in the washer unit for acting in response to the liquid pressure to hold or sustain the wiper operation to enable a dry wiping of the windshield surface.

A further object of the invention is to provide a windshield cleaning system having a compact structural assemblage providing efficient windshield cleaning operation.

These and further objects and features of the invention will become more apparent from the following description and the accompanying drawings wherein:

FIG. 1 is a perspective view illustrating a portion of a vehicle having a windshield cleaner arrangement embodying the principles of the invention;

FIG. 2 is an enlarged plan view in partial section showing certain elements used in the arrangement of FIG. 1;

FIG. 3 is a view generally as seen from line 3—3 in FIG. 2;

FIG. 4 is a partial section view as seen from line 4—4 in FIG. 2;

FIG. 5 is a view as seen from line 5—5 in FIG. 2;

FIG. 6 is an elevation view illustrating part of a switch mechanism used in the arrangement of FIG. 2;

FIG. 7 is a section view as seen from line 7—7 in FIG. 6;

FIG. 8 is a view similar to FIG. 6 but showing another position of the parts during operation;

FIG. 9 is a view similar to FIG. 8 showing a still further position of the parts illustrated in FIG. 6;

FIG. 10 is a perspective view of a lever linkage arrangement used in the switch mechanism of FIG. 6;

Figure 11:
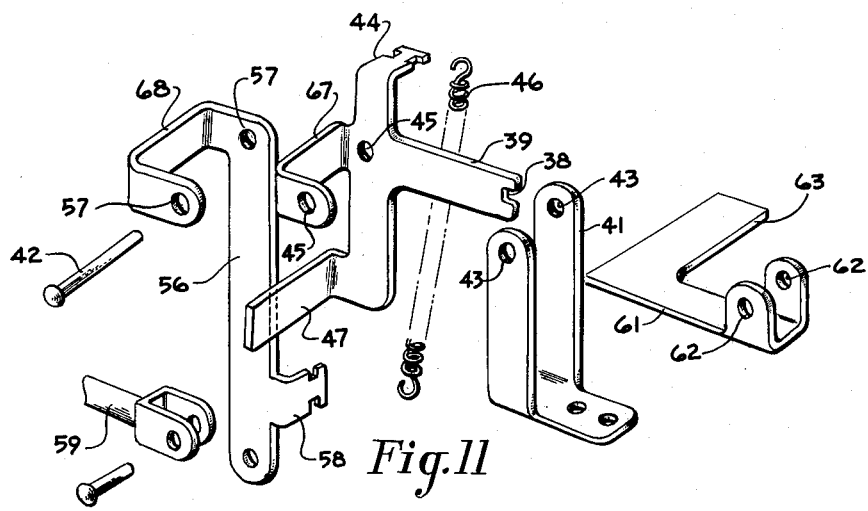
FIG. 11 is an exploded view of the lever linkage arrangement of FIG. 10.

Referring now to the drawings and more particularly to FIG. 1, numeral 16 identifies a motor vehicle having a windshield 17 on which are mounted wiper blades 18 supported on wiper arms 19 pivotally affixed for oscillating movement to effect wiping action of the blades upon the windshield. The ends of the wiper arms 19 are connected to levers 21 which are attached to a crank assemblage 22 rotated by a shaft 23 projecting from a gear box 25, to cause reciprocal movement of the levers 21. The shaft 23 is driven by a drive shaft 30 of wiper motor 24 which may be vacuum operated, hydraulically operated, or electrically operated, the motor shown being of the last mentioned type.

Shaft 23 is of extended length and has secured near its outer end a sleeve 26 having formed at one end a single tooth 27 arranged for engagement with a like tooth 28 provided upon one end of a sleeve member 29, the latter of which is arranged for limited axial movement upon the shaft 23. Thus, the two sleeves are detachably connected through a clutch as provided by the teeth 27 and 28. At the other end of the sleeve member 29 are arranged collars 31 providing a groove 32 for reception of a yoke member 33, as best seen in Figs. 2 and 3. One end of the yoke member 33 is pivotally affixed to an arm 34 supported upon a plate member 36 which is removably secured to gear box 25 by means such as screws 37. The opposite end of the yoke member 33 engages a slot 38 formed in a switch linkage member 39 which forms part of a switch assemblage 40. Switch linkage member 39 is pivotally supported in a bracket 41 which is secured to the plate member 36, such pivotal support being effected by a pin 42 which engages holes 43 formed in bracket 41 and holes 45 formed in the linkage member 39. The latter includes an integral arm 44 part of which is disposed at right angles to the portion of the linkage member containing the slot 38, said arm 44 being arranged for receipt of one of a spring 46. A further arm member 47 is integrally arranged to extend from the body of the linkage member 39, said arm 47 providing an abutment surface for the end of a control cable in the form of a Bowden wire 48, as best seen in Fig. 2.

As the linkage member 39 pivots on the pin 42 the yoke member 33 will be pivoted upon the arm 34 to cause an axial movement of the sleeve member 29, resulting in the engagement of tooth 28 with tooth 27. The sleeve member 29 has an eccentric comprising an eccentrically arranged disc or cam 50 surrounded by a strap part of a crank lever 49, the free end of which abuts a compression spring 51 arranged on one end of a piston rod 52. The crank lever has an elongated slot 53 for receipt of a pin 54 secured in one end of the piston rod 52, said pin and slot arrangement providing limited amount of lost motion between the crank arm and the piston rod. It will be seen that when the yoke member 33 causes a shifting of the sleeve member 29 for engagement of the tooth 28 with the tooth 27, rotary motion of the shaft 23 will be transmitted to the sleeve member 29 causing eccentric disc 50 to reciprocate the crank lever 49, which motion produces reciprocating movement of the piston rod 52. Eccentric disc 50 is angularly positioned upon shaft 23 to assure that liquid spraying will occur in coordinated sequence upon the windshield relative to wiper blade movement to achieve most effective washing and wiping action.

Switch assemblage 40 includes a linkage member 56 one end of which is pivotally mounted upon the pin 42 by way of holes 57 the other end of which has an arm 58 part of which is formed at a right angle to the body of linkage member 56 and which is arranged to receive the lower end of the spring 46. The free end of the linkage member 56 has pivotally attached thereto one end of a rod member 59. The switch assemblage 40, also includes a linkage member 61 which is pivotally supported upon the pin 42 via holes 62, said linkage member having a flat portion 63 extending at a right angle to the body of the linkage member 61 for engaging a button 64 of a normally open, spring-loaded electrical switch 66.

The linkage members 39 and 56 have arm portions 67 and 68 respectively, which are arranged for abutment with the linkage member 61, as will be more clearly described hereinafter.

Piston rod 52 has a head portion 69 slidably arranged in a chamber 71, said chamber being adapted for reception of liquid from an inlet passageway 72, and being further adapted for outward flow of liquid through a passageway 73. A spring-loaded valve 74 is provided at the inner end of passageway 72 to allow one way flow of liquid into the chamber 71, while a spring-loaded valve 76 is arranged in passageway 73 to allow one way flow of liquid from the chamber 71. A hose, or conduit, 77 leading from a reservoir 78, is provided for flow of cleaning liquid from the reservoir into inlet passageway 72, while a second hose, or conduit, 79 is provided to conduct cleaning liquid from the outlet passageway 73 to spray jets 81 positioned for spraying of cleaning liquid on designated areas of the vehicle windshield. A passageway 82 leads from the chamber 71 to a spring-loaded check valve 83, which when unseated, will allow flow of liquid from the chamber 71 into a chamber 84 via port 86. A flexible diaphragm 87 is arranged in the chamber 84 and has connected thereto the end of the rod member 59. A helical spring 88 surrounding the rod member 59, is compressively arranged between the diaphragm and a wall of the chamber 84 to urge the diaphragm toward that end of the chamber containing the port 86.

Immediately behind the check valve 83 is a cavity 89 which is connected to the inlet passageway 72 by means of a passageway 91 in which is adjustably positioned a bleed screw 90 which may be set to regulate the flow of liquid from the cavity 89 to the passageway 72.

Figure 12:
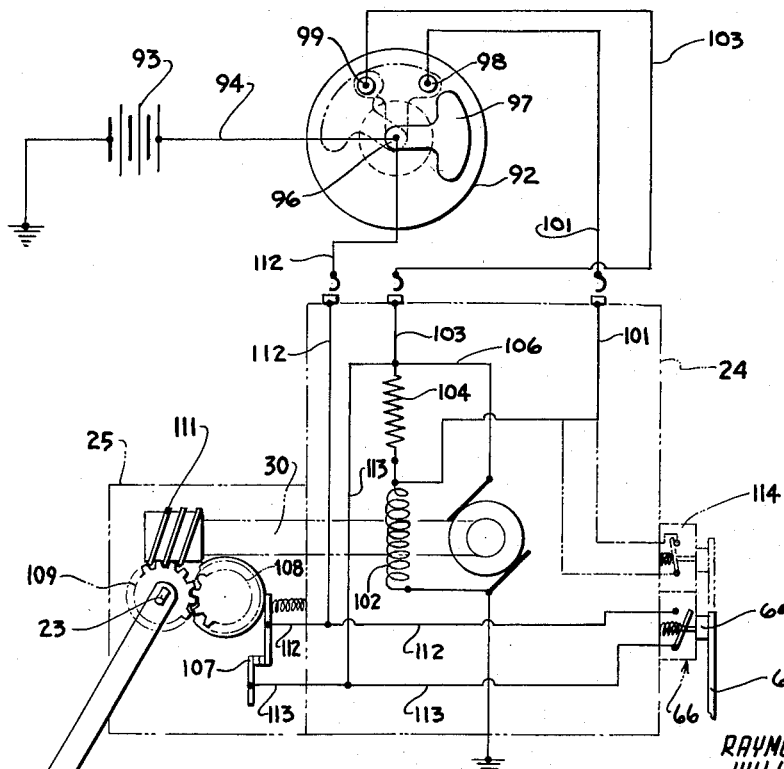
FIG. 12 is a schematic view illustrating an electrical circuit used in the arrangement shown in FIG. 1.

Wiper motor 24 is controlled by an electrical switch 92 which is located for convenient manipulation by the vehicle operator, the electrical connections for said wiper motor being illustrated in FIG. 12. Switch 92 is connected to the vehicle battery 93 via wire 94, the latter of which connects with a pivot post 96. Rotatably mounted upon the pivot post is an electrical contact arm 97 arranged for slidable engagement with contacts 98 and 99. A wire 101 connects the contact 98 to one end of a motor field winding 102, while a wire 103 connects the contact 99 to one end of a motor field resistance 104. A wire 106 connecting with wire 103 conducts current across the armature of the motor. The wiper motor 24 has a spring-loaded parking switch 107 which is actuated by a cam gear 108 meshing with a gear 109 driven by worm 111, the latter of which is driven by the motor shaft 30. A wire 112 extends between the pivot post 96 and is bifurcated for connection with the parking switch 107 at one end and the electrical switch 66 at the other end. A wire 113 connecting with the wire 103, is bifurcated for connection with the parking switch 107, and the electrical switch 66.

When the contact arm 97 is in the extreme clockwise position, as illustrated in solid lines in FIG. 12, it will be seen that electrical circuit will be established from the pivot post 96 through wire 112, parking switch 107, wire 113, and wire 106 across the armature, also through resistance 104 and field winding 102, to cause operation of the wiper motor. As the shaft 30 is rotated to motor parking position, the switch 107 will be opened thus breaking the circuit through the motor and terminating motor operation.

Movement of the contact arm 97 in a counterclockwise direction, for engagement with the contacts 98 and 99 results in motor operation. In such position of the contact arm 97 it will be seen that current will flow through wire 101 and field winding 102, while at the same time current will flow through wire 103 and wire 106 across the motor armature to cause slow speed motor operation.

Further rotation of the contact arm 97 in a counterclockwise direction, results in the sole engagement of the arm 97 with contact 99. In such position of the contact arm, current will flow through wire 103, resistance 104, field winding 102, and also through wire 106 across the motor armature resulting in high speed wiper motor operation.

It will be seen that upon closing of the contacts of the electrical switch 66 by movement of the flat portion 63 of the switch assembly 40, current will flow from wire 112 through the switch, in wire 113, then through the resistance 104 and the field winding 102, and simultaneously through the wire 106 across the motor armature to cause high speed wiper motor operation. In such manner, operation of the wiper motor will be initiated independently of the position of contact arm 97 relative to the contacts 98 and 99.

From a study of the above described circuit arrangement it will be obvious that wiper motor operation, as required for windshield washing and wiping, may be effected by closure of the contacts of switch 66. If the wiper motor happens to be operating at the time a washing and wiping operation is desired, closure of the switch 66 will have no effect upon the operation of the wiper motor. In other words, if the wiper motor is operating at low speed it will continue to operate at low speed upon closure of the contacts of switch 66, and if it is operating at high speed it will continue operating at high speed upon closure of said switch. Since it is desirable to have high speed motor operation during a windshield washing and wiping cycle, a normally closed electrical switch 114 may be arranged in the circuit of wire 101, which will operate to provide high speed motor operation during a washing cycle. Upon movement of the flat portion 63 of the switch assembly 40, the contacts of switch 66 will be closed while the contacts of switch 114 will be open, thus disrupting the circuit in wire 101 and causing current flow through the wire 113, resistance 104, field winding 102, and at the same time through wire 106 and across the motor armature, resulting in high speed motor operation. Accordingly, use of the electrical switch 114, in the wire 101, will assure high speed motor operation during washing and wiping cycle even though the wiper motor is operating at low speed when a washing and wiping cycle is initiated. Switch 92 incorporates a push button (not shown), for the longitudinal movement of the Bowden wire. To initiate a washing and wiping cycle, the vehicle operator need only push the button in switch 92 whereupon the opposite end of the Bowden wire 48 will move the arm 47 of the switch assembly 40, to cause counter-clockwise rotation of the linkage member 39 about the pin 42, thus causing engagement of arm portion 67 with the flat portion 63 of linkage member 61. Such rotary motion will cause the top end of the spring 46 to be shifted rearwardly past the axial line of the pivot pin 42, resulting in a snap action movement which causes depression of switch button 64 (FIG. 8), and initiating wiper motor operation as above described. Simultaneously, the yoke member 33 will be urged upwardly by the slotted end of the linkage member 39, causing the engagement of tooth 28 with tooth 27 of the sleeve 26. Since sleeve 26 is attached to shaft 23 which is rotated by the wiper motor, such rotary motion will be transmitted to the eccentric disc 50, causing reciprocating motion of the piston rod 52 and the piston head portion 69.

Reciprocating action of the piston head 69 will result in the pumping of cleaning liquid from the reservoir 78 through hose 77, passageway 72, past valve 74, into chamber 71, from where the liquid will be forced past the valve 76, into outlet passageway 73, hose 79, to the spray jets 81 and will be sprayed upon predesignated areas of the windshield. It will be observed that the spraying will be interrupted by virtue of the reciprocating motion of the piston head 69, while at the same time the wiper blades 18 will be continuously oscillated. The combination of interrupted spray and continuous wiping action will result in the efficient washing and wiping of the windshield.

A certain amount of cleaning liquid in the chamber 71 will be forced into passageway 82, past the check valve 83, into cavity 89, from whence it will flow by way of port 86 into the chamber 84, to exert pressure upon the diaphragm 87 which will be moved in the direction of the spring 88, compressing the latter. Movement of the diaphragm 87 will cause like movement of the rod member 59, resulting in counter-clockwise movement of the linkage member 56 about the pin 42. The lower end of the spring 46 will be shifted past the axis of the pin 42, resulting in a snap action clockwise movement of the linkage member 39, to shift the yoke member 33 downwardly and cause disengagement of tooth 28 from tooth 27. Such action will result in the cessation of liquid pumping by the piston 69, however, wiper motor operation will continue by virtue of the fact that the arm portion 68 of the linkage member 56 will continue to hold the flat portion 63 of linkage member 61 in downward engagement with the button 64 of electrical switch 66.

Liquid in chamber 84 will gradually flow from said chamber back to passageway 72 via passageway 91. The rate of liquid flow return may be regulated by adjustment of the screw 90 so that the return movement of the diaphragm 87 under the urging of compression spring 88, may be set to achieve any particular motor cut-off time desired, which cut-off time is thus selectively variable. This arrangement provides an automatically operable timing means for sustaining wiper motor operation after the termination of the liquid spray. Return movement of the rod member 59 will cause a clockwise rotation of the linkage member 56 about the pin 42, whereupon the arm portion 68 will release pressure upon the flat portion 63 of the linkage member 61 to allow upward movement of the button 64 of switch 66, thus breaking the electrical circuit and causing termination of motor operation.

From the foregoing it will be seen that by application of the principles of the invention, a vehicle windshield washing and drying arrangement may be provided in which cleaning liquid is applied to the windshield in an interrupted manner and in synchronism with the action of the wiper blades. In addition, the arrangement of the invention allows for regulation of the wiping time after cessation of spraying operation. A further feature of the invention resides in the fact that the pumping mechanism is arranged exteriorly of the reservoir thereby providing greater use of the reservoir volume for storage of cleaning liquid.

The foregoing description has been given in detail without thought of limitation since the inventive principles involved are capable of assuming other physical embodiments without departing from the spirit of the invention and the scope of the appended claims.

What is claimed is:

1. In a vehicle windshield cleaning system having a wiper motor, a reservoir for a supply of cleaning liquid, a wiper blade arranged for oscillating movement upon the windshield, motion transmission means arranged between the motor and the wiper blade, a pump means in communication with said reservoir, said pump means being operable by the wiper motor and adapted to cause an interrupted spray of cleaning liquid upon the windshield, timing means for providing a period of joint wiper motor and pump operation, and means adapted to prolong wiper motor operation for a selectably variable time after cessation of liquid spraying upon the windshield.

2. In a vehicle windshield cleaning system having a wiper motor, a reservoir for a supply of cleaning liquid, a wiper blade arranged for oscillating movement upon the windshield, a motion transmission means arranged between the motor and the wiper blade, a pump means in communication with said reservoir, said pump means being operable by the wiper motor and adapted to cause a spray of cleaning liquid upon the windshield, control means for initiating a joint wiper motor and pump operation, timing means for providing a period of joint wiper motor and pump operation, and means adapted to prolong wiper motor operation for a selectably variable time after cessation of liquid spraying upon the windshield.

3. In a vehicle windshield cleaning system having an electrically powered wiper motor, a pump assembly adapted for delivery of cleaning liquid for spraying upon the windshield in an interrupted manner, said pump assembly formed to provide a first liquid receiving chamber, a piston reciprocably arranged in said chamber, motion transmission means arranged for conversion of rotary motion of a shaft driven by the wiper motor into reciprocating motion to cause movement of said piston, a clutch means for connection of the motion transmission means with the rotatable shaft, and a switch mechanism for operation of the clutch means and the closing of an electrical circuit to cause wiper motor operation conjointly with the delivery of the cleaning liquid by the pump assembly, and means for prolonging wiper motor operation for a predetermined time after cessation of liquid spraying including a second liquid receiving chamber operatively connected to the pump assembly and having a liquid pressure responsive means adapted for operation of the switch mechanism.

4. In a vehicle windshield cleaning system having an electrically powered wiper motor, a pump assembly adapted for delivery of cleaning liquid for spraying upon the windshield in an interrupted manner, said pump assembly formed to provide a first liquid receiving chamber, a piston reciprocably arranged in said chamber, motion transmission means arranged for conversion of rotary motion of a shaft driven by the wiper motor into reciprocating motion to cause movement of said piston, a clutch means for connection of the motion transmission means with the rotatable shaft, and a switch mechanism for operation of the clutch means and the closing of an electrical circuit to cause wiper motor operation conjointly with the delivery of the cleaning liquid by the pump assembly, and means to prolong wiper motor operation for a predetermined time after cessation of liquid spraying including a second liquid receiving chamber operatively connected to the pump assembly and having a liquid pressure responsive means adapted for operation of the switch mechanism, and means to gradually release the liquid in the second chamber to cause the switch mechanism to interrupt the electrical circuit of the wiper motor.

5. In a vehicle windshield cleaning system having an electrically powered wiper motor, a pump assembly, a movable member driven by the wiper motor operatively arranged for transmitting motion for driving a wiper blade upon the windshield, pump driving means for causing said pump assembly to spray cleaning liquid onto said windshield, interconnecting means for operatively connecting the pump driving means with said movable member, an electrical switch operative for completing a circuit through the motor, and a switch assemblage having first means for causing the actuation of said interconnecting means with the completing of an electrical circuit to said motor, and second means adapted to disengage said interconnecting means while allowing continued completion of an electrical circuit to said motor to thereby produce prolonged wiper operation after the cessation of liquid spraying.

6. A vehicle windshield cleaning system comprising a wiper motor, a wiper blade, motion transmitting means arranged between said motor and said blade, a reservoir for a supply of solvent, pump means in communication with said reservoir, said pump means being operable by said wiper motor for causing an interrupted spray of solvent to be supplied to said windshield, control means for initiating joint operation of said wiper motor and said pump means, automatically operable timing means responsive to a force produced by the operation of said wiper motor when coupled to said washer pump for providing a period of joint wiper motor and washer pump operation, and control means for varying the length of wiper motor operation after the cessation of liquid spraying.

7. A windshield cleaning system comprising a wiper blade, a wiper motor for driving said blade, solvent projecting means, control means for actuating said wiper motor, means for coupling said wiper motor to said solvent projecting means for causing said solvent projecting means to project solvent on a windshield, and automatically operable timing means responsive to a force produced by the operation of said wiper motor when coupled to said solvent projecting means for terminating operation of said solvent projecting means after a period of joint operation, and means for terminating wiper motor operation after a selectably variable period of time following the termination of operation of said solvent projecting means.

8. A windshield cleaning system comprising a wiper blade, a wiper motor for driving said blade, a solvent pump, control means for actuating said cleaning system, said control means including switch means for coupling said wiper motor to a source of energy, cam means adapted to be driven by said wiper motor, linkage means adapted to be driven by said cam means, said control means including means for causing said cam means and said linkage means to transmit motion from said wiper motor to drive said pump means, timing means operable during the joint operation of said wiper motor and said solvent pump for terminating the pump driving relationship between said wiper motor and said pump after a period of joint operation, said switch means thereafter maintaining said wiper motor in operation for a selectably variable period after the termination of pump operation.

9. A windshield cleaning system comprising a wiper blade, a wiper motor adapted to drive said blade, a solvent pump in communication with a solvent reservoir, switch means for selectively coupling said wiper motor to an energy source, linkage means positioned between said wiper motor and said solvent pump, said linkage means being normally ineffective for transmitting motion between said wiper motor and said pump, control means for coupling said linkage means between said wiper motor and said solvent pump whereby said wiper motor causes said solvent pump to project said solvent onto a windshield, automatic timing means responsive to a force produced by the operation of said wiper motor when coupled to said solvent pump for terminating the driving relationship effected by said linkage means after a period of joint operation of said wiper motor and said solvent pump to thereby terminate operation of said solvent pump, said switch means permitting said wiper motor to remain in operation for a selectably variable period after the termination of pump operation.

10. A windshield cleaning system comprising a wiper blade, a wiper motor for driving said blade, solvent projecting means, means for selectively coupling said solvent projecting means to said wiper motor whereby said wiper motor causes said solvent projecting means to project solvent onto said windshield, timing means responsive to a force produced by the wiper motor when coupled to the solvent projecting means for terminating solvent projection after a period of joint solvent projection and wiper motor operation, and means for terminating wiper motor operation after a selectably variable period of time following the termination of solvent projection.

11. A windshield cleaning system comprising a wiper blade, a wiper motor for driving said blade, solvent projecting means, first control means for causing actuation of said wiper motor independently of said solvent projecting means, linkage means operatively interposed between said wiper motor and said solvent projecting means, second control means for initiating operation of said wiper motor and actuating said linkage means whereby motion produced by said wiper motor causes said solvent projecting means to project solvent onto said windshield, timing means responsive to a force produced by the wiper motor when coupled to the solvent projecting means for providing a period of joint operation of said solvent projecting means and said wiper motor, and control means for permitting said wiper motor to continue in operation for a selectively variable period after the termination of solvent projection.

References Cited in the file of this patent
UNITED STATES PATENTS

| | | |
|---|---|---|
| 1,738,884 | Gearhart | Dec. 10, 1929 |
| 2,059,224 | French | Nov. 3, 1936 |
| 2,743,473 | Oishei | May 1, 1956 |
| 2,856,901 | Kvarnstrom et al. | Oct. 21, 1958 |
| 2,878,505 | Ziegler | Mar. 24, 1959 |